(12) United States Patent
Chiu

(10) Patent No.: US 6,742,464 B1
(45) Date of Patent: Jun. 1, 2004

(54) AUTOMATIC CLEANING DEVICE FOR THE SEED ABSORBING NEEDLES OF A VACUUM PLANTER

(76) Inventor: Te-Wang Chiu, No.56, Min Sheng Street, Feng-Yuan City 42041 (TW)

( * ) Notice: Subject to any disclaimer, the term of this patent is extended or adjusted under 35 U.S.C. 154(b) by 0 days.

(21) Appl. No.: 09/439,308

(22) Filed: Nov. 10, 1999

(51) Int. Cl.[7] ................................................. A01C 7/04
(52) U.S. Cl. ...................................... 111/174; 221/211
(58) Field of Search .............................. 111/77, 78, 174, 111/76, 75, 171, 178, 179, 180, 181, 185, 182; 221/211, 263, 266, 277, 264, 265

(56) References Cited

U.S. PATENT DOCUMENTS

| | | | | |
|---|---|---|---|---|
| 4,019,651 A | * | 4/1977 | Starr et al. ................... | 221/211 |
| 4,669,922 A | * | 6/1987 | Hooper et al. ............. | 111/86 X |
| 5,392,722 A | * | 2/1995 | Snipes et al. ................ | 111/174 |
| 6,092,609 A | * | 7/2000 | Jeffrey et al. ................ | 172/311 |

* cited by examiner

Primary Examiner—Robert E. Pezzuto

(57) ABSTRACT

An automatic cleaning device for the seed absorbing needles of a vacuum planter includes a rectangular vacuum rack rotatable sliding with a pair of lateral plate and operated by a first pneumatic pump, a seed planting mechanism having a plurality of aligned thru holes for engaging with a plurality of planting pipes under a plurality of tubular needle of the vacuum rack and a sliding plate operated by a second pneumatic pump disposed with the seed planting mechanism. When the first pneumatic pump provides negative air pressure, the tubular needles regularly and repeatedly pick up the seeds from a seed container and drop the seeds down into the planting pipe. When the first pneumatic pump timely provides positive air pressure to clean the needles, the sliding plate operated by a second pneumatic pump will close the planting pipe to prevent the filth or dirt from the air from contaminating the tubular needles.

9 Claims, 7 Drawing Sheets

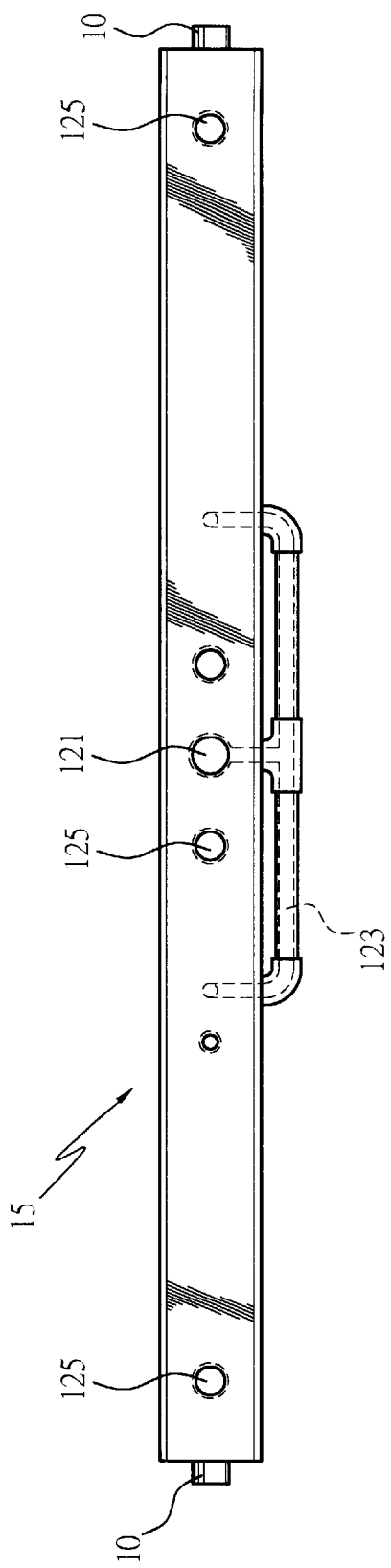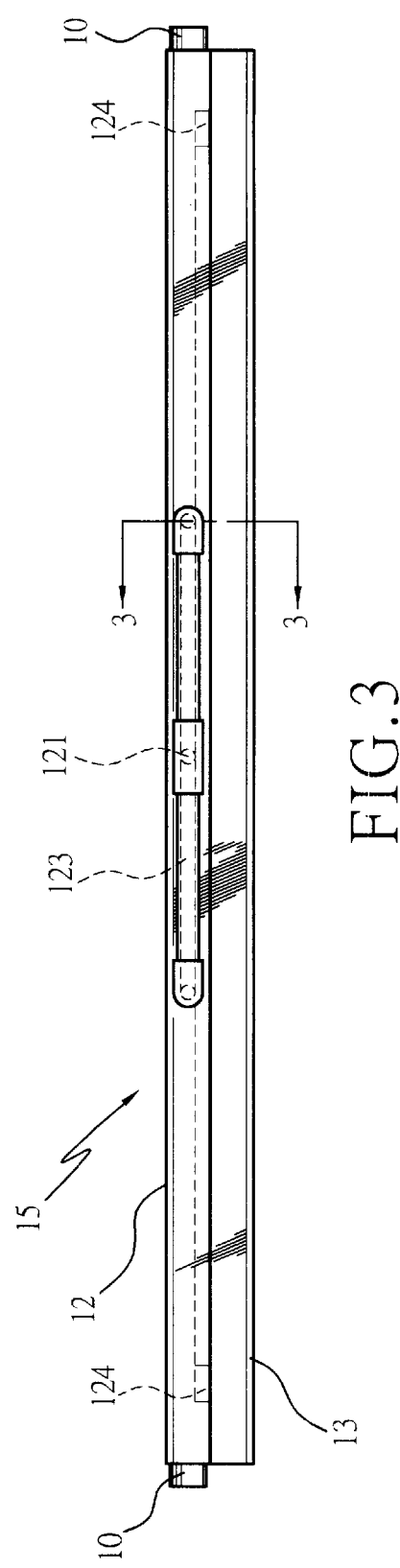

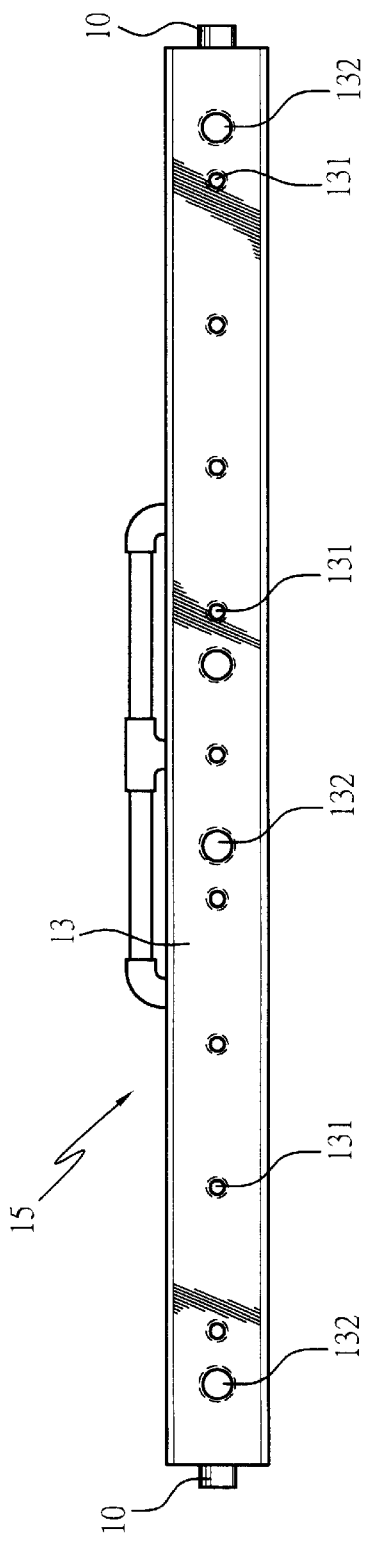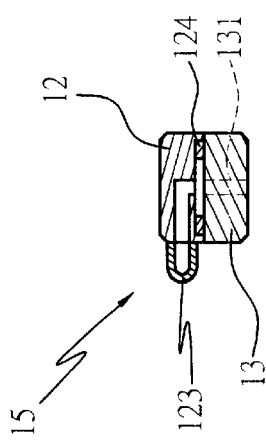

7'—7'

7'—7'

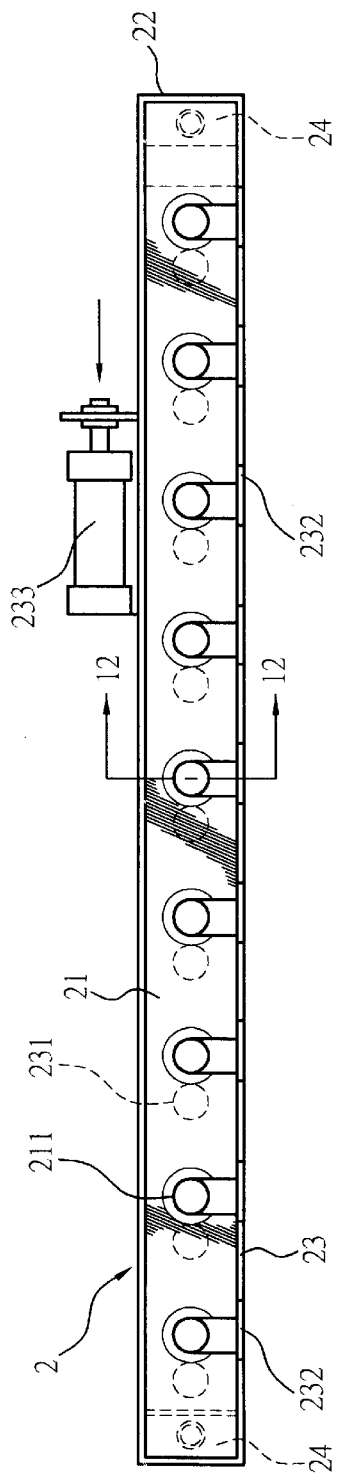
FIG.12
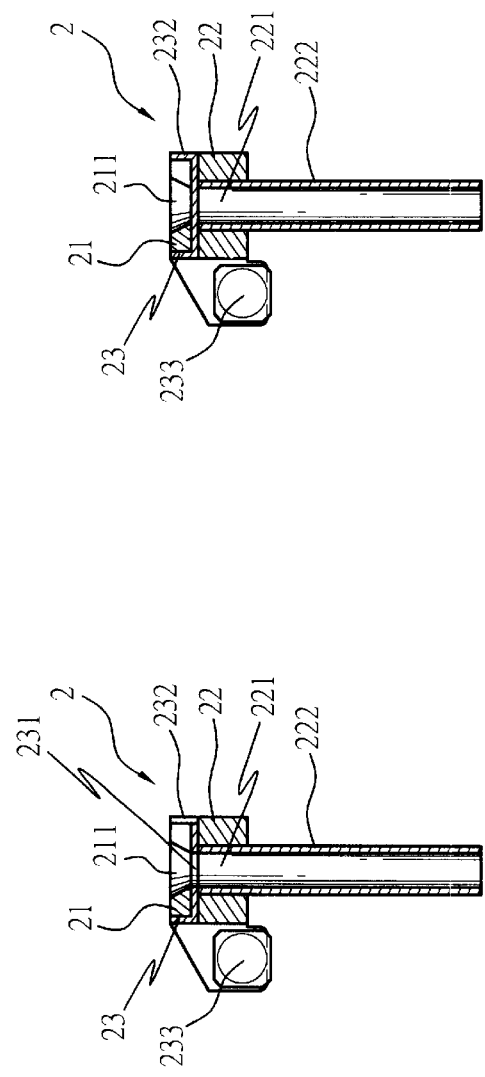
11—11
FIG.13
12—12
FIG.14

AUTOMATIC CLEANING DEVICE FOR THE SEED ABSORBING NEEDLES OF A VACUUM PLANTER

BACKGROUND OF THE INVENTION

The present invention relates to planters and more particularly to an automatic cleaning device for the seed absorbing needles of the planter which device can keep the needles always in clear and smooth condition without obstructing by filth or dirt.

Typical seed distributing system of a planter comprises a plurality of seed absorbing needle spacedly disposing under a transverse vacuum rack and communicating with a pneumatic pump on the top of the vacuum rack which is slidable on a pair of supports. The pneumatic pump provides intermittent air pressures to operate the seed absorbing needles to pick up the seeds from a seed container and then to drop them down into the earth through a plurality of planting tubes thereunder. This procedure is done alternately and repeatedly in cooperation with the arcuate sliding of the vacuum rack and the seeds will be planted regularly and spacedly in the earth. This type of seed distributing system has great disadvantage because it lacks of an automatic cleaning device therefore some of the seed absorbing needles may be obstructed by filth or dirt during the operation of the vacuum planter and causing vacancies of the seeds waiting to be replanted. Besides, a manual replantation of the seeds or a manual repairing of the seed absorbing needles may waste a great deal of time and labor that is not economical.

SUMMARY OF THE PRESENT INVENTION

The present invention has a main object to provide an automatic cleaning device for the seed absorbing needles of a vacuum planter which device uses the intermittently inverse operation of the pneumatic pump to alternately provide the inverse air pressure to clean the seed absorbing needles which will not be obstructed by filth or dirt.

Another object of the present invention is to provide an automatic cleaning device for the seed absorbing needles of a vacuum planter which device keeps the seed absorbing needles always reliable in order to prevent a manual replantation of the seeds and the manual repairing of the seed absorbing needles.

The present invention will become more fully understood by reference to the following detailed description thereof when read in conjunction with the attached drawings.

BRIEF DESCRIPTION OF THE DRAWINGS

FIG. 3 is an elevational view of a vacuum rack of the present invention, FIG. 4 is a top view of FIG. 3, FIG. 5 is a bottom view of FIG. 3, FIG. 6 is a section take along line 3—3 of FIG. 3, FIG. 12 is a bottom view of FIG. 10, FIG. 13 is a section taken along line 11—11 of FIG. 11, and FIG. 14 is a section taken along line 12—12 of FIG. 12.

DETAILED DESCRIPTION OF THE PREFERRED EMBODIMENT

Figure 1:
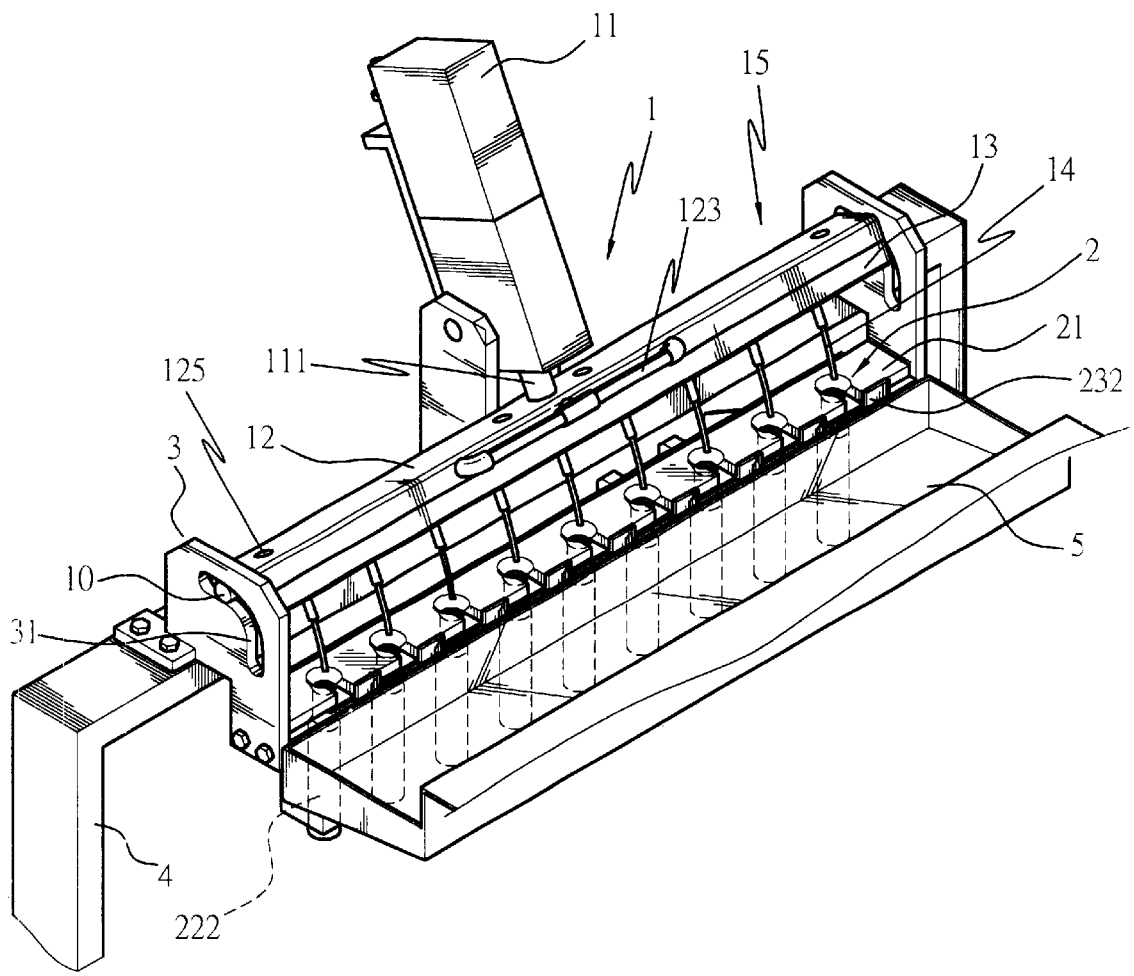
FIG. 1 is a perspective view showing a preferred embodiment of the present invention.
Figure 2:
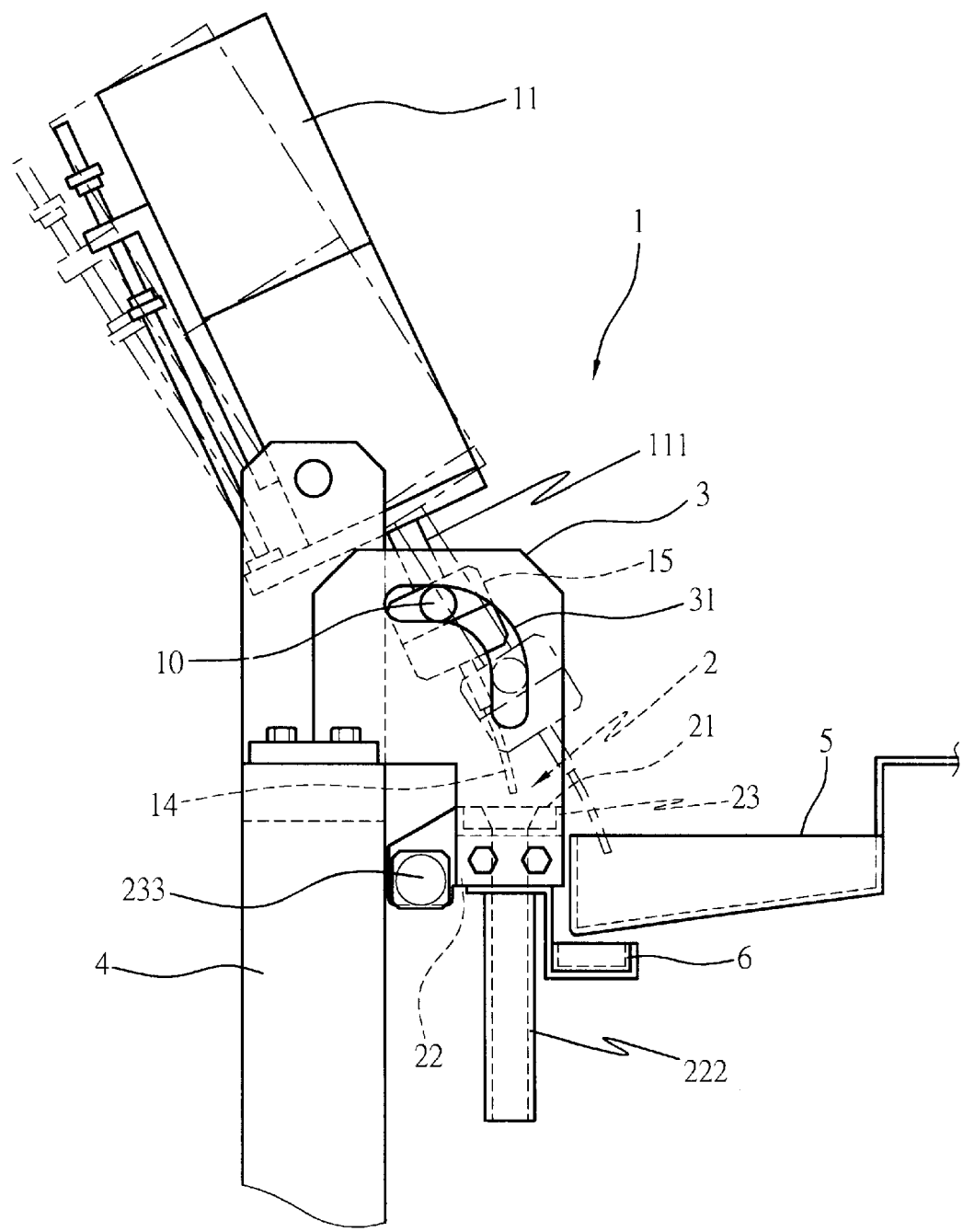
FIG. 2 is a side view of the seed distributing system of the present invention.
Figure 7:
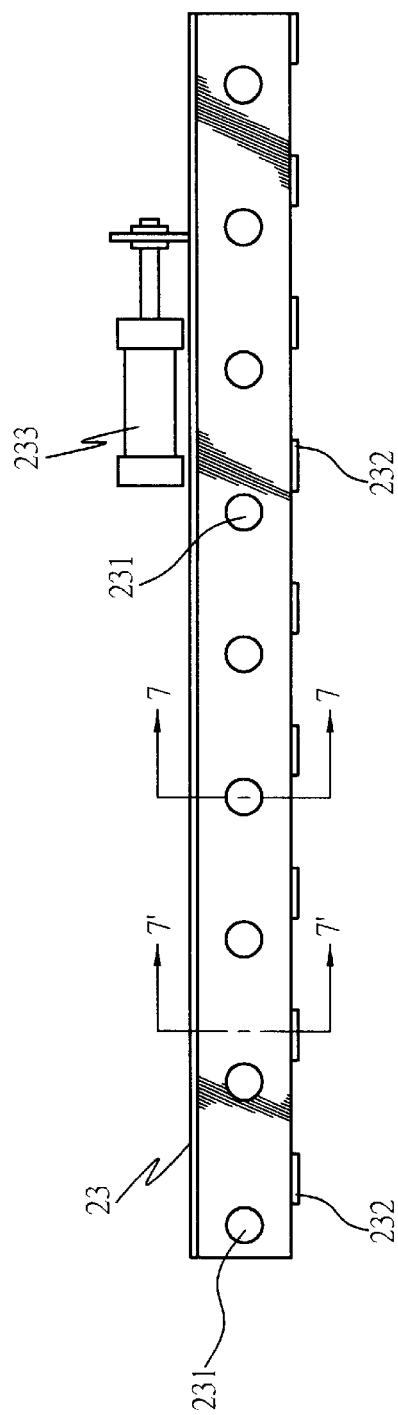
FIG. 7 is a top view showing a sealing plate of a planting mechanism.
Figure 8:
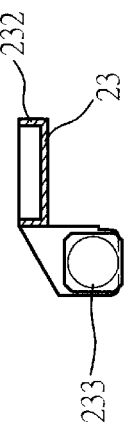
FIG. 8 is a section taken alone line 7—7 of FIG. 7.
Figure 9:
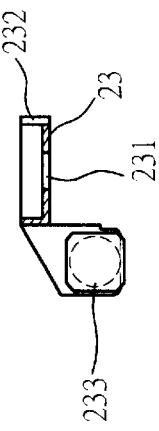
FIG. 9 is a section taken alone line 7'—7' of FIG. 7.
Figure 11:
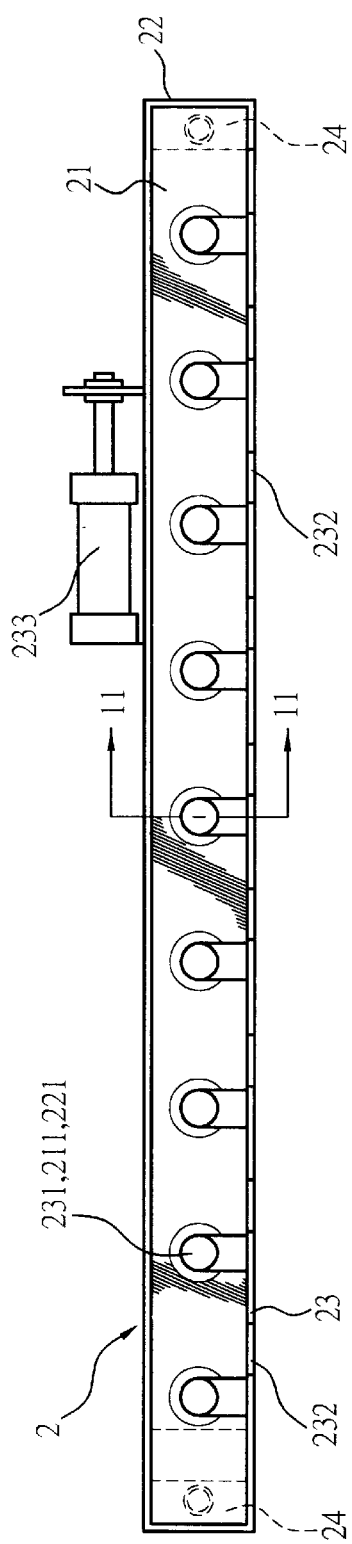
FIG. 11 is a top view of FIG. 10.
Figure 10:
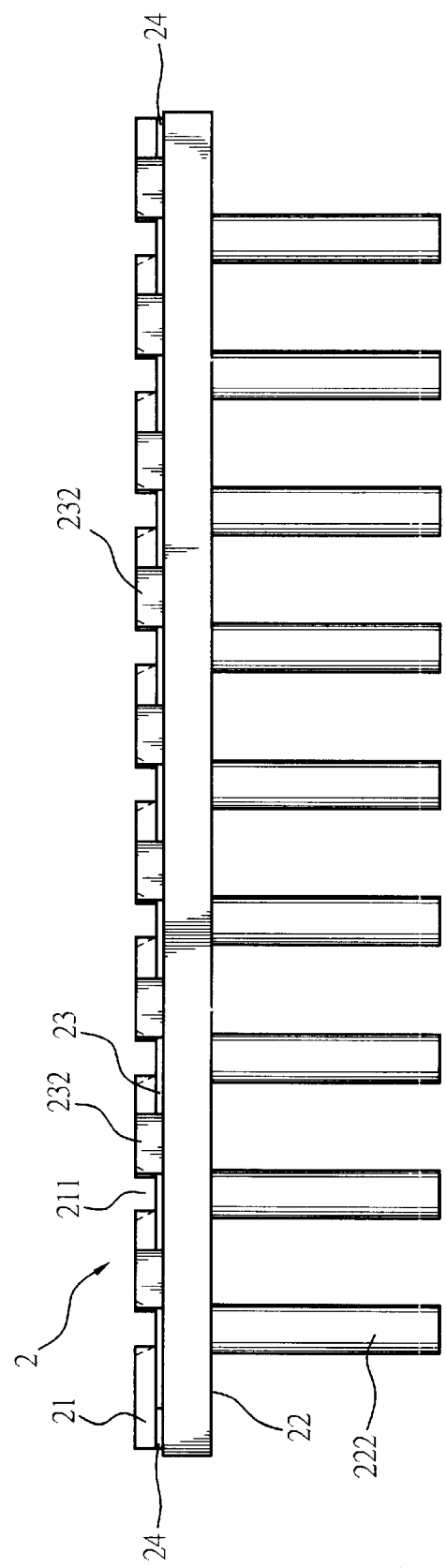
FIG. 10 is an elevational view of the planting mechanism.

With reference to FIGS. 1 and 2 showing a preferred embodiment of the present invention comprises generally a seed distributing mechanism 1 and a seed planting mechanism 2 beneath the seed distributing, mechanism 1.

The seed distributing mechanism 1 includes a rectangular vacuum rack 15 which is comprised an upper portion 12 and a lower portion 13 releasable connected together with the upper portion including a rubber sealing means 124 engaged thereinbetween around four sides. The upper portion 12 has a pair of pulleys 10 at two ends each slidably engaged into an arcuate sliding slot of a pair of lateral plates 3 which are in turn connected near two end of a U-shaped support 4, a first pneumatic pump 11 rotatably pivoted to a vertical plate from the top of the U-shaped support 4 and having a tubular plunger 111 inserted into a first vent 121 centrally formed in the top of the upper portion 12 (as shown in FIG. 3), a branch pipe 123 disposed on a front side of the upper portion 12 having three branches 123 for dispersing the air pressure form first vent 121 to the entire vacuum rack 15 (as shown in FIGS. 4 and 6). The upper portion 12 has also a plurality of first vertical thru holes 125 spacedly formed in the body for releasable connecting the lower portion 13 of the vacuum rack 15.

The lower portion 13 of the vacuum rack 15 (as shown in FIGS. 3 and 5) includes a plurality of second vertical thru holes 132 spacedly formed in the body and made in registry with first vertical thru holes 125 of the upper portion 12 and a plurality of second air vent 131 spacedly formed along the length of the entire body for respectively connecting the tops of the seed absorbing needles 14. Note that a number of lower portions 13 of different caliber needles 14 may be prepared to change to consist with different size of the seeds.

A container 5 is disposed on the front side of the seed absorbing needles 14 and connected to the lateral plates 3. So that when the vacuum rack 15 slides to the lower end of the arcuate sliding slot 31, the free ends of the needles 14 can reach to the seeds.

Referring to FIGS. 7–14 and FIG. 2 again, the seed planting mechanism 2 is disposed under the vacuum rack 15 and secured on two ends to the lower end of the lateral plates 3 respectively and comprises an upper plate 21 connected to a lower plate 22 with a pair of cushions 24 disposed theretween abutting two ends thereof so that a clearance is defined to permit a sliding, plate 23 to be received in. The cushions 24 have a thickness slightly thicker than that of the sliding plate 23 so as to have the sliding plate 23 to be slidable thereabout. The upper plate 21 has a plurality of first aligned thru holes 211 of taper section formed spaced apart in the body along the length and made in alignment with seed absorbing needles 14. The lower plate 22 has a plurality of second aligned thru holes 221 made in registry with the first aligned thru holes 211 and a plurality of planting pipes 222 secured on their tops to the second aligned thru holes 221 respectively. The sliding plate 23 which is operated to slide about by a second pneumatic pump 233 positioned at an inner side of the lower plate 22 has a plurality of indentions 231 made in alignment with the first and second aligned thru holes 211 and 221 and a plurality of side projections 232 spacedly projected upward from an outer side and positioned alternately with the indentions 231. Normally, the indentions 231 keep in alignment with the first and second aligned thru holes 211 and 221 so as to permit the seeds from the seed absorbing needles 14 enabling to drop down therethrough. When the first pneumatic pump 11 operates inversely to clean the needles 14, the indentions 231 slide away from the aligned thru holes 211 and 221 on the synchronization of the second pneumatic pump 233 to closed the aligned thru holes 211 and 221 by the sliding plate 23 in order to prevent the filth or dirt of the earth from stirred up by the air pressure to contaminate the needles 14. The operation of the second pneumatic pump 232 is designed such that it swiftly closes the aligned holes 211 and 221 and slowly opens them in order to prevent the residual outward air pressure from the needles 14 passing through the holes 211 and 221 to stir up the earth.

In operation, when the tubular plunger 111 stretches outward to force the vacuum rack 15 sliding downward to the lower end of the arcuate sliding slots 31 and the needles 14 reach to the seeds in the seed container 5, the first pneumatic pump 11 immediately provides appropriate absorbing force to the needles 14 which absorb the seeds into their free ends. Then the tubular plunger retreats to force the vacuum rack 15 sliding upward to the upper end of the arcuate sliding slot 31 to have the free ends of the needles 14 reaching to the top of the first aligned 25 thru hole 211, simultaneously, the first pneumatic pump 11 releases the absorbing force from the needles 14 which therefore drop the seeds down to the planting tubes 222 through the aligned thru holes 211 and 221 regularly plant the seeds into the earth. This procedure is done repeatedly by the first pneumatic pump 11. After a certain time of the regular operations, the first pneumatic pump 11 will provide once an inverse pressure force to below in the needles. While, the second pneumatic pump 233 will cooperatively operate the sliding plate 23 to perform the operation of closing and/or opening the aligned holes thru 211 and 221 as described the above. Fourthly, the seed planting mechanism 2 includes a seed collector 6 under the lower plate 22 to collect the seed which is failed to enter into the aligned hole 211.

The above described automatic cleaning device of the present invention can keep the seed absorbing needles 14 in reliable condition so that the plantation of the seed will be performed regularly without any absence.

While the invention has been explained in relation to the preferred embodiment, it is to be understood that various modifications thereof will become apparent to those skilled in the art upon reading to this specification. Therefore, it is to be understood that the invention disclosed herein is intended to corer such modifications as fall within the scope of the appended claims.

I claim:

1. An automatic cleaning device for seed absorbing needles of a vacuum planter comprising:
 a seed distributing member comprising:
  a rectangular vacuum rack including an upper portion having a pair pulleys at two ends thereof respectively sliding into an arcuate sliding slot of a pair of lateral plates which are spacedly projected upward from a U-shaped support under said vacuum rack near said two ends thereof, a first pneumatic pump rotatably pivoted to a vertical plate which is projected upward from a top of said U-shaped support, a tubular plunger including a first end slidably engaged into lower end of said first pneumatic pump and a second end connected to the upper portion of said vacuum rack through a first air vent thereof, a branch means connected to a front side of the upper portion having three branches connected to the first air vent and the interior of said upper portion for dispersing air pressure from the first air vent to the entire interior of said vacuum rack, and a plurality of first vertical thru holes spacedly formed in the upper portion along the length thereof; a lower portion having a plurality of second vertical thru holes made in registry with the first vertical thruholes for releasible connecting the lower portion to the upper portion including a rubber sealing means engaged therein-between around four sides thereof, a plurality of second air vents spacedly formed in the lower portion along the length thereof and a plurality of tubular needles having their upper ends connected to the second air vents respectively communicating to the tubular plunger and their lower end extending downward;
 a seed planting member disposed under said tubular needles and having two ends respectively secured to a lower end of said lateral plates, said seed planting member comprising a rectangular body, an upper plate including a plurality of first aligned thru holes of taper section formed spaced apart along the length thereof and made in alignment with the tubular needles of said vacuum rack; a lower plate connected to the upper plate with a pair of cushion means engaged thereinbetween abutting two ends thereof to define a clearance therebetween for slidably receiving a slider plate therein, a plurality of second aligned thru holes spacedly formed in registry with the first aligned thru holes of the upper plate, a plurality of planting pipes having their tops engaged into the second aligned thru holes respectively and their lower ends extending downward, a plurality of side projections spacedly projected upward from an outer side of the lower plate and a second pneumatic pump disposed to an inner side of the lower plate and connected with the slider plate.

2. The automatic cleaning device as recited in claim 1 wherein said slider plate has a plurality of indentions spacedly formed along the length thereof and made in alignment with the first and second aligned thru holes and alternate with the side projections.

3. The automatic cleaning device as recited in claim 1 further includes a seed container positioned in front of the seed planting member and connected to a front end of said lateral plate respectively.

4. The automatic cleaning device as recited in claim 1 further includes a seed collector positioned under said seed container and connected to bottom of the seed planting member.

5. The automatic cleaning device as recited in claim 1 wherein said vacuum rack is operated by said tubular plunger to slide about the arcuate sliding slots of said lateral plates.

6. The automatic cleaning device as recited in claim 1 wherein said tubular needles are operated by said first pneumatic pump to regularly absorb the seeds from said seed container and to drop down the seeds into the planting pipes of the seed planting member through said first and second aligned thru holes thereof.

7. The automatic cleaning device as recited in claim 1 wherein said first pneumatic pump timely provides inverse air pressure to clean the tubular needles.

8. The automatic cleaning device as recited in claim 1 wherein said second pneumatic pump synchronously slides the sliding plate to close the first and second aligned thru holes when said first pneumatic pump provides inverse air pressure to clean the tubular needles.

9. The automatic cleaning device as recited in claim 1 wherein the lower portion of the vacuum rack is changeable to be consistent with different size of seeds.

\* \* \* \* \*